United States Patent
Wilkinson et al.

(10) Patent No.: US 10,592,486 B1
(45) Date of Patent: *Mar. 17, 2020

(54) DEVICE AGNOSTIC ACTIVE/ACTIVE DATA CENTER AFFINITY

(71) Applicant: USAA, San Antonio, TX (US)

(72) Inventors: Christopher T. Wilkinson, San Antonio, TX (US); Shannon Thornton, San Antonio, TX (US); Phillip C. Schwesinger, San Antonio, TX (US); Jason P. Larrew, Helotes, TX (US); Tommy B. Lavelle, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/674,292

(22) Filed: Aug. 10, 2017

Related U.S. Application Data

(63) Continuation of application No. 14/217,810, filed on Mar. 18, 2014, now Pat. No. 9,753,958.

(60) Provisional application No. 61/952,647, filed on Mar. 13, 2014, provisional application No. 61/794,790, filed on Mar. 15, 2013.

(51) Int. Cl.
*G06F 16/22* (2019.01)
*H04L 29/08* (2006.01)
*G06F 16/435* (2019.01)

(52) U.S. Cl.
CPC ............ *G06F 16/22* (2019.01); *G06F 16/435* (2019.01); *H04L 67/2809* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,123,608 B1 | 10/2006 | Scott et al. | |
| 7,254,548 B1 | 8/2007 | Tannenbaum | |
| 7,609,619 B2 * | 10/2009 | Naseh | H04L 45/28 370/225 |
| 9,195,850 B2 | 11/2015 | Hess | |
| 2007/0055672 A1 | 3/2007 | Stevens | |

(Continued)

OTHER PUBLICATIONS

United States Notice of Allowance issued in U.S. Appl. No. 14/217,810 dated May 12, 2017.

(Continued)

*Primary Examiner* — Uyen T Le
(74) *Attorney, Agent, or Firm* — Eric L. Sophir; Dentons US LLP

(57) ABSTRACT

Systems, methods, and computer-readable and executable instructions are provided for providing a device agnostic active/active data center. Providing a device agnostic active/active data center can include receiving user communication assigned from a content delivery network (CDN) provider. In addition, providing a device agnostic active/active data center can include determining a designated database for the user communication. Furthermore, providing a device agnostic active/active data center can include assigning a destination address to the designated database for the user communication.

20 Claims, 4 Drawing Sheets

(56) References Cited

U.S. PATENT DOCUMENTS

2012/0101985 A1     4/2012   Kemp et al.
2012/0109852 A1     5/2012   Lingam et al.
2012/0233315 A1     9/2012   Hoffman et al.

OTHER PUBLICATIONS

United States Non-Final Office Action issued in U.S. Appl. No. 14/217,810 dated Jan. 30, 2017.
United States Final Office Action issued in U.S. Appl. No. 14/217,810 dated Sep. 19, 2016.
United States Non-Final Office Action issued in U.S. Appl. No. 14/217,810 dated Jan. 21, 2016.

\* cited by examiner

DEVICE AGNOSTIC ACTIVE/ACTIVE DATA CENTER AFFINITY

CROSS-REFERENCE TO RELATED APPLICATIONS

This non-provisional patent application is a continuation of the U.S. patent application Ser. No. 14/217,810, filed Mar. 18, 2014, which claims priority to the U.S. Provisional Application Ser. No. 61/794,790, entitled "Device Agnostic Active/Active Data Center Affinity," filed Mar. 15, 2013, and the U.S. Provisional Application Ser. No. 61/952,647, filed Mar. 13, 2014, entitled "Data Center Assignment Batch Job," all of which are hereby incorporated by reference in their entirety.

TECHNICAL FIELD

The present disclosure relates to devices, systems, and methods for providing a device agnostic active/active data center.

BACKGROUND

Data reading and writing can occur within a number of databases throughout an institution system. If there are multiple users that share an account of the institution system each user can be reading and/or writing to a different database within the number of databases. Determining what database a particular user will utilize can be based on a current load balance between the number of databases. A content delivery network (CDN) provider can send a log-in request to one of the number of databases based on the current load balance of the number of databases and if the log-in request is correct, a user can be validated and gain access to a database.

DETAILED DESCRIPTION

The present disclosure provides a device agnostic active/active data center that can be used to provide and update information for a number of users. The active/active data center can be used to group the number of users to enable users that have a particular relationship to read and/or write user information within a designated database.

Figure 1:
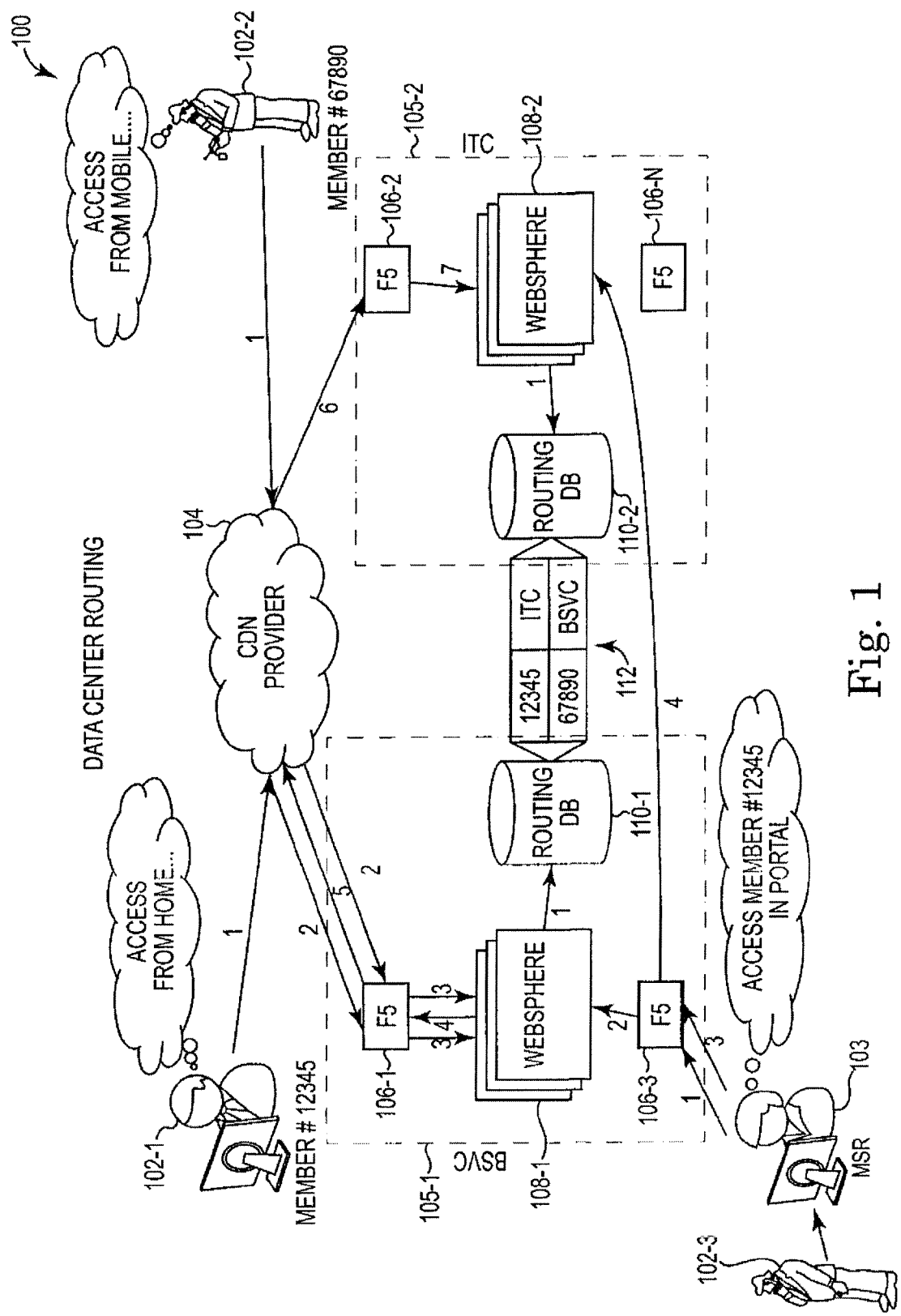
FIG. 1 illustrates an embodiment of a device agnostic active/active data center system that can be utilized with one or more embodiments of the present disclosure.

FIG. 1 illustrates an example of an embodiment of a device agnostic active/active data center system 100 that can be utilized with one or more embodiments of the present disclosure. The device agnostic active/active data center system 100 can include a number of users (e.g., 102-1, 102-2, . . . , 102-N). The number of users can, for example, be members (e.g., registered users, customers, etc.) of an organization (e.g., insurance company, financial institution, etc.). For example, user 102-1 can be a customer and/or member of an institution.

User 102-1 can have a user profile with the institution. The user profile can include account information relating to the user 102-1 and/or a plurality of users. For example, the user profile information can include, but is not limited to: a date of registration with the institution, account number, billing information, user name, multiple other user names on the account, password, type of coverage, among other types of profile information. In some cases there can be multiple users under a single user profile. For example, if the institution is an insurance company the main policy holder of the insurance policy can be the user and the one or more other users can include the user's spouse, children, beneficiaries, and/or other dependents of the user in the same policy.

The number of users can attempt to access their account utilizing a number of methods. For example, the number of methods can include, but are not limited to: a mobile or desktop computing device, or a telephone, among other methods. With a possibility of multiple users for a single user profile account and a possibility for multiple methods of accessing the single user profile account there can be a possibility of having multiple users accessing the single user profile account simultaneously (e.g., at a similar time period, etc.).

Multiple users accessing a single user profile account can result in a first user accessing the user profile account in a first database and a second user accessing the user profile account in a second database. Multiple users accessing the user profile account from different databases can cause a number of problems. For example, a first user can access a first database and perform a write operation and a second user can access a second database and perform a read operation at a simultaneous time. In this example, the read operation by the second user may not include the write operation by the first user.

User 102-1 can send communication (e.g., log-in post, etc.) to access a database from a computing device (e.g., home computing device, such as a laptop, desktop, tablet, etc.). For example, user 102-1 can send a log-in post to access account information relating to a user profile of the user 102-1. The user 102-1 can send the log-in post to a content delivery network (CDN) provider 104 (e.g., Akamai, etc.). The user log-in post can include a "user name" (e.g., user identification) and "password" to log-in to the user profile account.

The CDN provider 104 can deliver content and/or data to a number of end-users (e.g., databases, etc.). In some embodiments, the CDN provider 104 can have web application accelerator capabilities. The web application accelerator can reduce web site access times (e.g., latency between requests) by compressing the content and/or data prior to delivering the content and/or data to the end-user.

The CDN provider 104 can receive the log-in post and the log-in post can include instructions to generate a number of mirror log-in posts. The number of mirror log-in posts can be duplicate copies of the user 102-1 log-in post.

The CDN provider 104 can determine a database (e.g., BSVC database 105-1, ITC database 105-2) to send and/or transfer the communication received from user 102-1. For example, the CDN provider 104 can determine a database to send one of the number of mirror log-in posts. The CDN provider 104 can determine the database to send the communication based, for example, on a load balancing protocol between the number of databases. For instance, the CDN provider 104 can determine the database based on a current load of each of the number of databases.

The CDN provider 104 can send one of the number of mirror log-in posts to a load balancer 106-1 within a database 105-1. The load balancer 106-1 can transfer the received log-in post to middleware 108-1 (e.g., WebSphere, etc.). The middleware 108-1 can be software that provides functions beyond the operating system of the database. For example, the middleware 108-1 can be used to exchange data between applications that have different operating systems.

The middleware 108-1 can be utilized to convert the username of user 102-1 to a corresponding member identifier (e.g., a member identifier having alphabetical, numeric, and/or symbols, 12345, 67890, A7890, etc.). For example, user 102-1 can designate an arbitrary username (e.g., username that user 102-1 can remember) and password combination or one can be assigned by the middleware. The middleware 108-1 can convert the username to a corresponding member identifier.

The corresponding member identifier can be sent to a routing database 110-1 that can include a database table 112. The database table 112 can include member identifiers for users of the number of databases. For example, the database table 112 can include member identifiers and a corresponding designated database for each of a number of users of a financial institution.

The corresponding member identifier can be compared to a database table 112 within the routing database 110-1. Comparing the corresponding member identifier to the database table 112 can be used to determine a designated database for the user 102-1. For example, user 102-1 can have a corresponding member identifier of 12345. In this example, the member identifier can be compared to the database table 112 to determine that the log-in post from user 102-1 is designated to be delivered to database ITC 105-2.

The routing database 110-1 can send a message to the middleware 108-1 that includes instructions to send the log-in post to database ITC 105-2. The middleware 108-1 can generate a cookie (e.g., a piece of data sent from a website and stored in a user's web browser while a user is browsing a website) that can include a destination address of a designated database for the user's log-in post. For example, the middleware 108-1 can send a message to the CDN provider 104, via the load balancer 106-1, that includes a cookie with instructions to forward one of the number of mirror log-in posts to database ITC 105-2. The CDN provider 104 can receive the message and send one of the number of mirror log-in posts to load balancer 106-2 within database ITC 105-2. The load balancer can send the received mirror log-in post to the middleware 108-2 of the database ITC 105-2 where the mirror log-in post can be verified by the database ITC 105-2.

In another example, user 102-2 can send a log-in post to the CDN provider 104. As described herein, the CDN provider 104 can determine a database to send the log-in post to a database (e.g., database BSVC 105-1, database ITC 105-2, etc.) based on a load balancing analysis by the CDN provider 104 or a load balancing device within the system. For example, the CDN provider 104 can send the log-in post of user 102-2 to a load balancer 106-1 within database BSVC 105-1. The load balancer 106-1 can send the log-in post of user 102-2 to middleware 108-2. The middleware 108-2 can convert the username and password of the log-in post to a member identifier that corresponds to the user 102-2. The member identifier can be used by the middleware 106-1 to compare with a database table 112 within a routing database 110-1. In this example, the member identifier of user 102-2 can be 67890 and the member identifier can correspond to database BSVC 105-1. In this example, the log-in post of user 102-2 is within the correct database according to the database table 112. In this example, the log-in post is retained within the database BSVC 105-1 and verified by the database BSVC 105-1 to confirm that the username and password correctly correspond to the user 102-2. If the log-in post is validated (e.g., username and password correspond to the user account) the user can access (e.g., read and/or write) information within the database.

Furthermore, in another example, a user 102-3 can contact (e.g., telephone call, etc.) a member service representative (MSR) 103 and provide log-in information (e.g., information to validate user). The MSR 103 can send the log-in information to a load balancer 106-3 similarly to the CDN provider 104. The load balancer 106-3 can send the log-in information to the middleware 108-1. The middleware can convert the log-in information to a member identifier. For example, the user 102-3 can provide a social security number as the log-in information and the middleware 108-1 can convert the social security number of the user 102-3 to a corresponding member identifier of the user 102-3. The member identifier can be compared to the database table 112 to determine a designated database for the user 102-3.

The user 102-3 can have a member identifier of 12345 and the corresponding designated database according to the database table 112 can be database ITC 105-2. In this example, the member identifier can be returned to the MSR 103. The MSR can send a message that includes a log-in post of the user and a cookie to the load balancer 106-3. The cookie can include instructions to transfer the log-in post to the middleware 108-2 of database ITC 105-2. The log-in post can be validated at the middleware 108-2 of the database ITC 105-2. If the log-in post is validated the user can access (e.g., read and/or write) information within the database.

In some cases there can be multiple users (e.g., user 102-1, user 102-2, user 102-N, etc.) that are associated with the same user profile. For example, user 102-1 and user 102-3 can be family members associated with the same user profile of an insurance company where user 102-1 and user 102-3 are associated with a particular insurance policy.

When multiple users are associated with the same user profile, the log-in post (e.g., username, password, etc.) can be different for each user. The different log-in posts can each be converted at the middleware (e.g., middleware 108-1, middleware 108-2) of a database to a corresponding member identifier. The member identifier can be the same for each of the multiple users associated with the same user profile. For example, user 102-1 can have a first log-in post and user 102-3 can have a second log-in post that is different than the first log-in post. In this example, the middleware 108-1 can convert the first log-in post and the second log-in post to a member identifier that corresponds to a particular member and/or user profile. If the member identifier is the same, then user 102-1 and user 102-3 can be associated with the same user profile even though user 102-1 and user 102-3 can be different users. This can also be beneficial where a user logs-in via different devices.

When multiple users are associated with the same user profile there is a possibility that multiple users may access information within the database and perform a number of read and/or write operations while logged into the database. To avoid a first user reading and/or writing from a different database compared to a second user reading and/or writing at a similar time (e.g., same time as first user, etc.) each user within a particular user profile can be designated to the same database. For example, if user 102-1 and user 102-3 are associated with the same user profile then they would be designated to the same database to avoid user 102-1 reading and/or writing on a first database and user 102-3 reading and/or writing on a second database.

In various embodiments, the first database and the second database can have the same or similar functions. For example, the first database and the second database can provide the same readable and/or writeable content to each user. With each database having the same or similar functions, a first user can change the readable data within an account in one database and a second user may be unaware of the first user's change if each user is interacting within a different database and/or the first user and second user are logged into the account at the same time.

Figure 2:
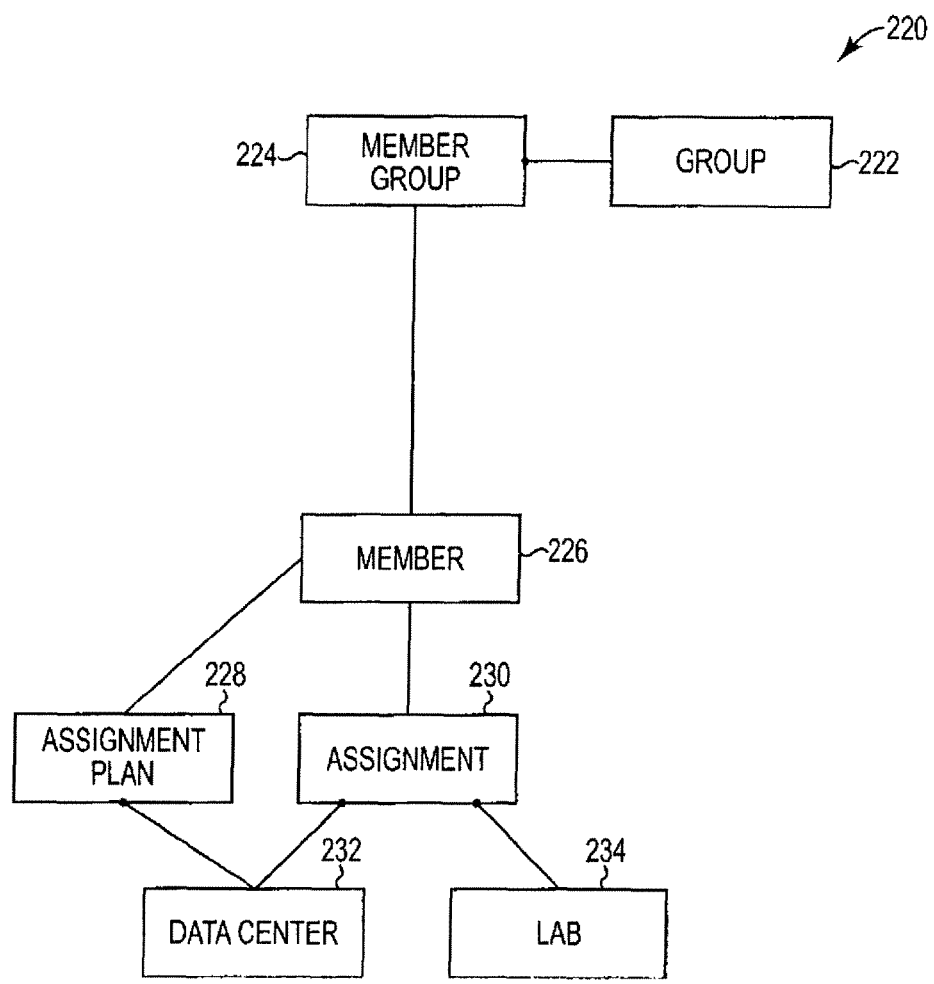
FIG. 2 illustrates a flow diagram for assigning a data center within a device agnostic active/active data center that can be utilized with one or more embodiments of the present disclosure.

FIG. 2 illustrates a flow diagram 220 for assigning a data center within a device agnostic active/active data center that can be utilized with one or more embodiments of the present disclosure. The flow diagram 220 can include a number of elements for assigning a data center for a particular user and/or member of an institution.

At box 222, a number of groups can be defined. Groups can be a collection of users and/or members of an institution. For example, a group can be a collection of users with similar attributes (e.g., similar assignments, similar type of users, etc.). An individual member and/or user can be in one or more groups based on the attributes of the individual member.

At box 224, a number of member groups can be defined. The member group can include a table of a group-to-member relationships. The member group table can be utilized to simplify the "many-to-many" relationship between the members and groups. For example, each member can be included in multiple groups and each group can have multiple members.

At box 226, a member can be identified for assignment. The member can be assigned to a database (e.g., within a data center) utilizing a batch job and/or load balancing technique. The batch job and/or load balancing technique can be part of an assignment plan. The assignment plan can be provided by a content delivery network (CDN) provider, as described herein.

At box 228, an assignment plan can be determined. The assignment plan can be predetermined before receipt of a communication and based on load balancing between a number of databases.

At box 232, a data center can be identified. The database can be identified by determining a type of received information at a CDN provider and determining a number of qualified destinations. For example, the number of qualified destinations can be a number of databases to provide services to the members of an institution.

At box 234, a number of labs can be identified. The number of labs can be a number of digital labs. The number of labs can include locations of research and development within the network. A particular member can be assigned a particular lab to send information for research and development.

At box 230, an effective assignment for the user can be identified. The effective assignment can include the assignment that can be utilized by a routing service such as a CDN provider. The effective assignment can be the same and/or similar to the assignment plan if there are no or limited changes made to the assignment plan.

Figure 3:
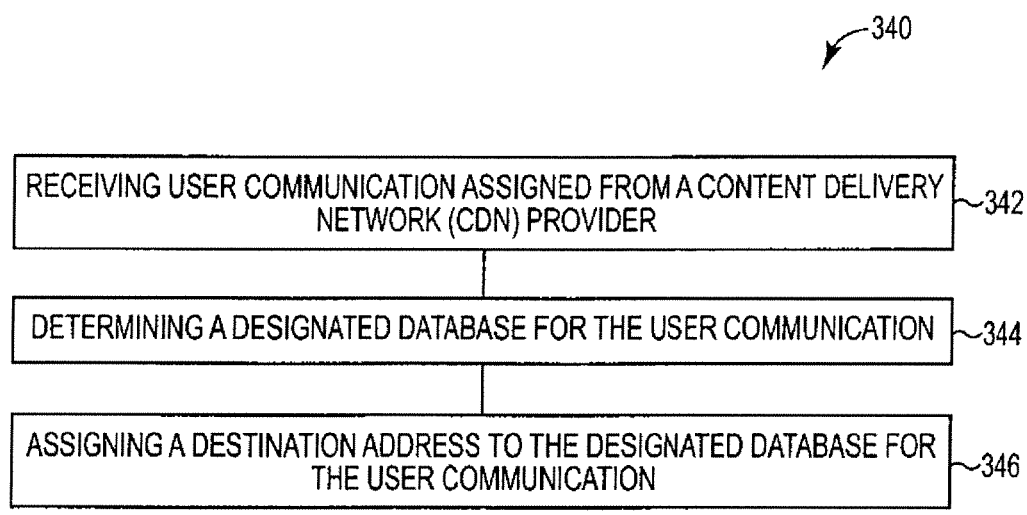
FIG. 3 illustrates a flow diagram of an example method for providing a device agnostic active/active data center that can be utilized with one or more embodiments of the present disclosure.

FIG. 3 illustrates a flow diagram of an example method 340 for providing a device agnostic active/active data center that can be utilized with one or more embodiments of the present disclosure. The method 340 can be utilized to designate members of an institution to a particular database based on an association. The method 340 can determine a designated database for a particular user and transfer communication associated with the particular user to the designated database.

At box 342, the method 340 can include receiving user communication assigned from a content delivery network (CDN) provider. The CDN provider can include web application accelerator capabilities.

The user communication can be a log-in post from a user. The log-in post can include log-in information relating to the user. For example, the log-in post can include a username and password for accessing a user account. The log-in post can be one of a multiple number of mirror log-in posts generated by the user and/or the CDN provider.

At box 344, the method 340 can include determining a designated database for the user communication based on a user profile. The designated database can be a database that corresponds to the user profile. For example, the designated database can be a database that corresponds to the user profile number within a database table, as described herein. The designated database can be the receiving database if there is not an existing designated database within the database table.

The designated database for a first user can be a database that is currently being utilized by a second user within the same user profile as the first user. For example, if a first user is utilizing a first database, a second user can be designated to the same database as the first user if the first user and the second user are within the same user profile. The first user and the second user can be within the same user profile for a number of reasons. For example, the first user and the second user may be associated with the same insurance policy and therefore within the same user profile.

At box 346, the method 340 can include assigning a destination address to the designated database for the user communication. Assigning the destination address can include sending a cookie to the CDN to instruct the CDN to send one of the mirror log-in posts to the designated database. In some cases, the designated database can be the receiving database and the user communication can be validated by the receiving database. If the user communication is validated, the user can access account information and services within the database.

The method 340 can include identifying a user profile for the received user communication. Identifying the user profile for the received user communication can include converting the log-in post to a member identifier. For example, the user profile for a number of users can be identified by a member identifier. That is, even though a number of users within a particular user profile each have a different username and password, each of the number of users can have the same member identifier to identify the user profile.

The method 340 can include monitoring the device agnostic active/active data center for failures. Monitoring the device agnostic active/active data center for failures can include utilizing a number of sureroute objects within the Akamai CND provider. The sureroute objects can be utilized with the Akamai CND provider to provide content delivery technology with mapping technology to determine an optimal (e.g., fastest, shortest) route between an origin site (e.g., user destination) and an end user (e.g., database).

Each of the databases can be tested utilizing tests (e.g., liveness tests, etc.) at various points within each of the databases. If the test determines that a database has failed, the CDN provider can automatically route service from the failed database to a different database.

Figure 4:
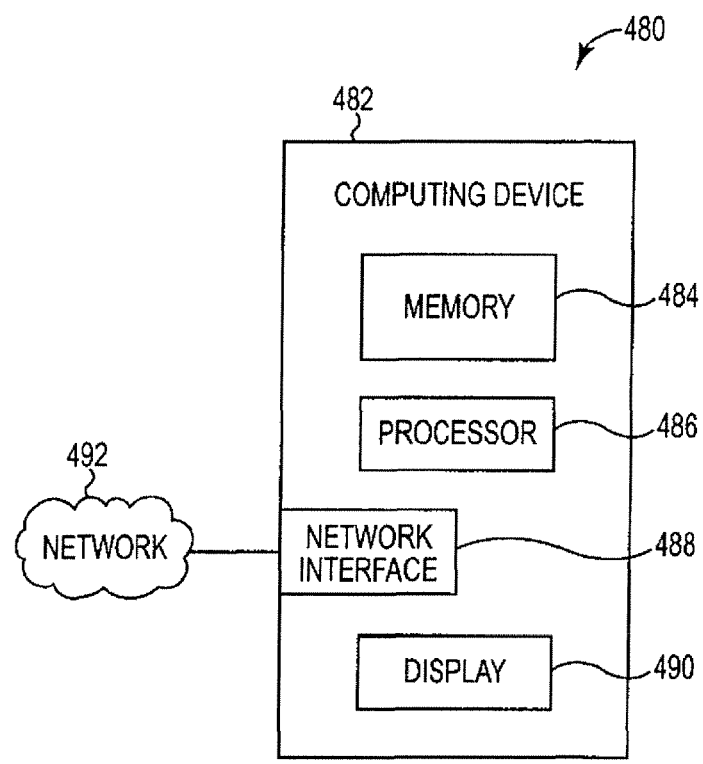
FIG. 4 illustrates an example computing device that can be utilized with one or more embodiments of the present disclosure.

FIG. 4 illustrates an example computing system 480 that can be utilized with one or more embodiments of the present disclosure. Computing device 482 can be, for example, a laptop computer, a desktop computer, or a mobile device (e.g., a mobile phone, a personal digital assistant, etc.), among other types of computing devices.

The computing device 482 can include a memory 484 and a processor 486 coupled to memory 484. Memory 484 can be any type of storage medium that can be accessed by processor 486 to perform one or more examples of the present disclosure (e.g., receiving user communication assigned from a content delivery network (CDN) provider, assigning a destination address to the designated database for the user communication, etc.). For example, memory 484 can be a non-transitory computing device readable medium having computing device readable instructions (e.g., computing device program instructions, machine readable instructions, computer readable instructions, etc.) and data stored thereon. The computing device readable instructions are executable by processor 486 to perform various examples of the present disclosure. The data can be used (e.g., processed and/or analyzed by) the computing device readable instructions during their execution.

Memory 484 can be volatile or nonvolatile memory. Memory 484 can also be removable (e.g., portable) memory, or non-removable (e.g., internal) memory. For example, memory 484 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 484 is illustrated as being located in computing device 482, embodiments of the present disclosure are not so limited. For example, memory 484 can, in addition to or alternatively, be located internal to another computing resource (e.g., enabling computer readable instructions to be downloaded over the Internet or another wired or wireless connection).

The computing device 482 can include a network interface 488. Network interface 488 can connect the computing device 482 to a network, such as network 492 illustrated in FIG. 4.

Network 492 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 492) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 492 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

The computing device 482 can also include a display 490. Display 490 can include, for example, a screen that can provide (e.g., display and/or present) information to a user of computing device 482.

Additionally, computing device 482 can receive information from the user of computing device 482 through an interaction with the user via display 490. For example, computing device 482 can receive input from the user via display 490 (e.g., a touch screen display or via another user input device such as a keyboard in response to interaction with items show on the display). For example, the user can enter the input into computing device 482 using, for instance, a mouse and/or keyboard associated with computing device 482 (e.g., display 490).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things. For example, "a number of sources" can refer to one or more sources.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment

What is claimed:

1. A computer-implemented method comprising:
receiving, by a computer from a content delivery network (CDN), a first communication associated with a first user accessing a user profile;
identifying, by the computer, in a data center table, a data center designated to receive the first communication, wherein the data center table comprises member identifiers and at least one corresponding data center, wherein the data center comprises a plurality of databases;
receiving, by the computer from the CDN, a second communication associated with a second user accessing the user profile with a computing device; and
upon the computer determining that the first user and the second user are accessing the user profile:
assigning, by the computer, to the second communication, the destination address of the data center designated to receive the first communication by assigning a data object to the computing device of the second user; and
notifying, by the computer, the CDN to route the second communication to the data center designated to receive the first communication.

2. The method of claim 1, further comprising:
storing, by the server, the second communication in a database; and
transmitting, by the server, the second communication to the data center.

3. The method of claim 1, wherein the data center comprises a plurality of databases designated to provide service to the first user.

4. The method of claim 1, wherein receiving the first communication of the first user includes receiving, by the computer, a mirror log-in post.

5. The method of claim 1, further comprising:
transmitting, by the computer, the first communication of the first user to the CDN provider based upon the computer determining that the destination address of the designated database is in a second data center.

6. The method of claim 5, wherein the CDN provider includes web application accelerator capabilities.

7. The method of claim 1, wherein the server transmits the first communication to a second database.

8. The method of claim 1, further comprising identifying, by the computer, the user profile associated with the first user for the first communication, wherein the user profile is associated with one or more users.

9. The method of claim 8, further comprising assigning, by the computer, the destination address to a communication of each of the one or more users associated with the user profile.

10. The method according to claim 1, wherein the data object comprises at least one of a cookie and header information.

11. A non-transitory computer-readable medium storing a set of instructions executable by a processor to cause a computer to:
receive from a content delivery network (CDN), a first communication associated with a first user accessing a user profile;
identify in a data center table, a data center designated to receive the first communication, wherein the data center table comprises member identifiers and at least one corresponding data center, wherein the data center comprises a plurality of databases;
receive, from the CDN, a second communication associated with a second user accessing the user profile with a computing device; and
upon determining that the first user and the second user are accessing the user profile:
assign, to the second communication, the destination address of the data center designated to receive the first communication by assigning a data object to the computing device of the second user; and
notifying, by the computer, the CDN to route the second communication to the data center designated to receive the first communication.

12. The non-transitory computer-readable medium of claim 11, wherein the instructions executable by the processor further cause the computer to:
store the second communication in a database; and
transmit the second communication to the data center.

13. The non-transitory computer-readable medium of claim 11, wherein the data center comprises a plurality of databases designated to provide service to the first user.

14. The non-transitory computer-readable medium of claim 11, wherein the data object comprises at least one of a cookie and header information.

15. The non-transitory computer-readable medium of claim 11, wherein the instructions executable by the processor further cause the computer to:
transmit the first communication of the first user to the CDN provider based upon the computer determining that the destination address of the designated database is in a second data center.

16. The non-transitory computer-readable medium of claim 15, wherein the CDN provider includes web application accelerator capabilities.

17. The non-transitory computer-readable medium of claim 11, wherein the instructions executable by the processor further cause the computer to:
transmit the first communication to a second database.

18. The non-transitory computer-readable medium of claim 11, wherein the instructions executable by the processor further cause the computer to:
identify the user profile associated with the first user for the first communication, wherein the user profile is associated with one or more users.

19. A system comprising a processor in communication with a non-transitory computer readable medium, wherein the non-transitory computer readable medium includes a set of instructions executed by the processor to:
receive from a content delivery network (CDN), a first communication associated with a first user accessing a user profile;
identify in a data center table, a data center designated to receive the first communication, wherein the data center table comprises member identifiers and at least one corresponding data center, wherein the data center comprises a plurality of databases;
receive, from the CDN, a second communication associated with a second user accessing the user profile with a computing device; and
upon determining that the first user and the second user are accessing the user profile:
assign, to the second communication, the destination address of the data center designated to receive the first communication by assigning a data object to the computing device of the second user; and
notifying, by the computer, the CDN to route the second communication to the data center designated to receive the first communication.

20. The system of claim 19, wherein the data object comprises at least one of a cookie and header information.

* * * * *